(12) United States Patent
Tipton

(10) Patent No.: US 11,064,679 B1
(45) Date of Patent: Jul. 20, 2021

(54) ANIMAL GROOMING TOOL VACUUM HOUSING ATTACHMENT

(71) Applicant: Jennifer Tipton, Billings, MT (US)

(72) Inventor: Jennifer Tipton, Billings, MT (US)

(*) Notice: Subject to any disclaimer, the term of this patent is extended or adjusted under 35 U.S.C. 154(b) by 180 days.

(21) Appl. No.: 16/274,509

(22) Filed: Feb. 13, 2019

(51) Int. Cl.
*A01K 13/00* (2006.01)
*A46B 15/00* (2006.01)
*A47L 7/00* (2006.01)

(52) U.S. Cl.
CPC ........ *A01K 13/001* (2013.01); *A46B 15/0053* (2013.01); *A47L 7/009* (2013.01); *A47L 7/0066* (2013.01)

(58) Field of Classification Search
CPC . A01K 13/001; A46B 15/0053; A47L 7/0066; A47L 7/009; A47L 9/06; A47L 9/0606; A47L 9/0613; A47L 9/067; A45D 24/32
See application file for complete search history.

(56) References Cited

U.S. PATENT DOCUMENTS

| | | | | |
|---|---|---|---|---|
| 2,727,303 A | * | 12/1955 | Marley | B26B 19/44 30/41.5 |
| 3,368,277 A | * | 2/1968 | Vevea | B26B 19/34 30/133 |
| 4,563,814 A | * | 1/1986 | Trichell | B26B 19/44 30/223 |
| 4,704,794 A | * | 11/1987 | Paradis | B26B 19/44 30/132 |
| 4,843,717 A | * | 7/1989 | Crane | B26B 19/44 30/133 |
| 4,909,554 A | * | 3/1990 | Pacione | A47L 13/144 15/105 |
| 4,970,788 A | * | 11/1990 | Hunts | B26B 19/44 30/133 |
| 4,985,999 A | * | 1/1991 | Iwasaki | A46B 13/02 30/133 |
| 6,152,199 A | * | 11/2000 | Nusbaumer | B60K 15/04 137/588 |
| 6,536,075 B1 | * | 3/2003 | Bonnet | A47L 5/24 15/344 |
| 8,555,463 B1 | * | 10/2013 | Laube | A47L 7/009 15/415.1 |

(Continued)

FOREIGN PATENT DOCUMENTS

JP 04361723 A * 12/1992 ........... A47L 9/0027

*Primary Examiner* — Ebony E Evans
*Assistant Examiner* — Zoe Tam Tran
(74) *Attorney, Agent, or Firm* — Edwin H. Crabtree; Ramon L. Pizarro

(57) ABSTRACT

A vacuum housing attachment used with a animal grooming tool for vacuuming loose fur and hair as an animal is groomed The housing attachment includes an inverted "U" shaped tool housing. The tool housing includes an open bottom portion, a closed first end portion and an open second end portion. The open second end portion is adapted for receiving the grooming tool therethrough. The tool housing is adapted for holding the grooming tool in a snug fit. Attached to a rear portion of the tool housing is a hollow handle. One end of the hollow handle includes a vacuum intake port for receiving the fur or hair from an animal, as the animal is being groomed. An opposite end of the hollow handle includes a vacuum exit port adapted for attachment to a vacuum tube.

11 Claims, 2 Drawing Sheets

(56) References Cited

U.S. PATENT DOCUMENTS

| | | | | |
|---|---|---|---|---|
| 9,220,237 B1* | 12/2015 | Dryden | ................ | A01K 13/002 |
| 2004/0006873 A1* | 1/2004 | Cutting | ................... | B26B 19/44 |
| | | | | 30/133 |
| 2009/0126649 A1* | 5/2009 | Porter | ................... | A01K 13/002 |
| | | | | 119/601 |
| 2011/0030620 A1* | 2/2011 | Jouan | ................... | A01K 13/002 |
| | | | | 119/611 |
| 2012/0285395 A1* | 11/2012 | Freidell | ..................... | A47L 9/06 |
| | | | | 119/625 |
| 2013/0145576 A1* | 6/2013 | Hollis | ....................... | A47L 7/00 |
| | | | | 15/368 |
| 2013/0145992 A1* | 6/2013 | Liang | ................... | A47L 9/0613 |
| | | | | 119/608 |
| 2016/0330933 A1* | 11/2016 | Baier | ................... | A46B 13/001 |
| 2017/0071156 A1* | 3/2017 | Cafasso | ................. | A47L 25/005 |
| 2017/0265431 A1* | 9/2017 | Urso | ................ | B25G 1/102 |
| 2018/0333028 A1* | 11/2018 | Carswell | .................. | A47L 9/06 |
| 2019/0193911 A1* | 6/2019 | Reiley | ................ | B65D 43/0212 |

* cited by examiner

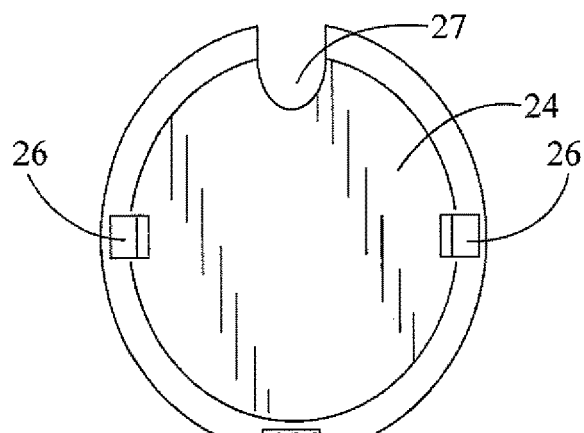
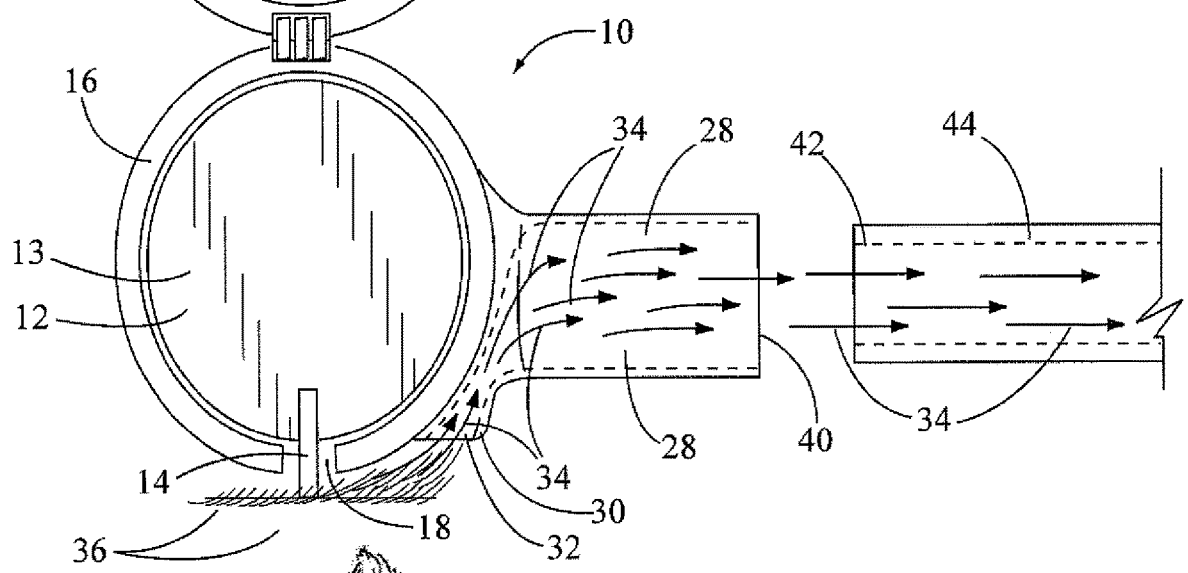
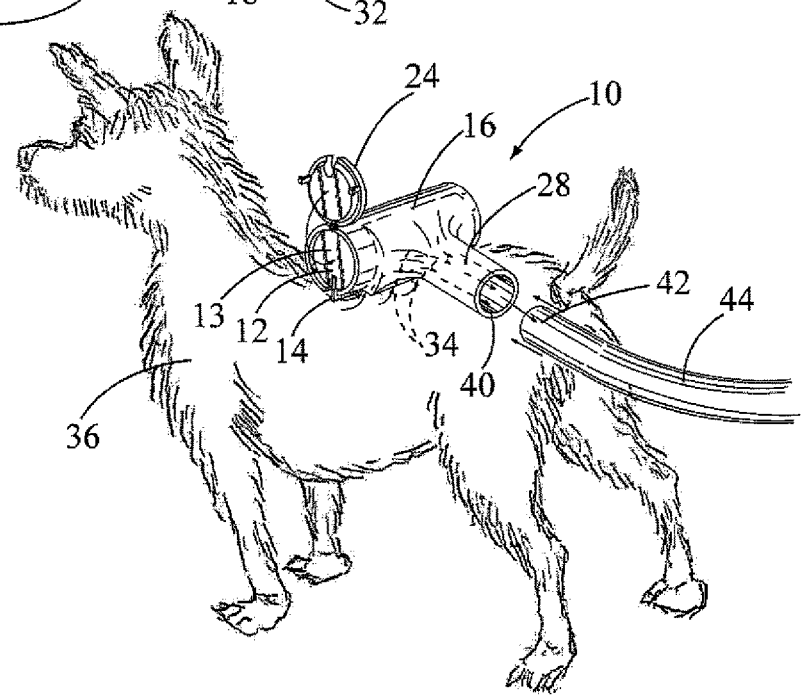
FIG. 3
FIG. 4

ANIMAL GROOMING TOOL VACUUM HOUSING ATTACHMENT

BACKGROUND OF THE INVENTION

(a) Field of the Invention

This invention relates to a vacuum housing attachment for attaching to an end of a vacuum tube and more particularly, but not by way of limitation, to a vacuum housing attachment adapted for receiving an animal grooming tool. The grooming tool used when grooming a horse, dog, cat and other domestic animals. The housing attachment is used for vacuuming up fur and hair as the animal is groomed.

(b) Discussion of Prior Art

Heretofore, the are various sizes and shapes of animal grooming tools. In particular, U.S. Pat. No. 9,474,250 to Tipton discloses a unique animal grooming tool that is adapted for gliding through an animal's fur and removing matted and loose hair. The subject vacuum housing attachment is adapted for receiving this type of grooming tool in a snug fit.

SUMMARY OF THE INVENTION

In view of the foregoing, it is a primary objective of the subject invention to provide a vacuum housing attachment adapted for quickly receiving an animal grooming tool therein and receiving and vacuuming animal fur and hair therethrough, as the animal is being groomed. This primary object eliminates the need of cleaning up and sweeping up the groomed fur and hair from a floor after the animal is groomed.

Another object of the invention is the vacuum housing attachment is adapted for receiving different sizes and shapes of animal grooming tools therein. The attachment can be easily adapted for attachment to different types of vacuum tubes.

The subject vacuum housing attachment includes an inverted "U" shaped tool housing. The tool housing includes an open bottom portion, a closed first end portion and an open second end portion. The open second end portion is adapted for receiving a grooming tool therethrough. The tool housing is adapted for holding the grooming tool in a snug fit. Attached to a rear portion of the housing is a hollow handle. One end of the hollow handle includes a vacuum intake port for receiving the fur or hair from an animal, as the animal is being groomed. An opposite end of the hollow handle includes a vacuum exit port adapted for attachment to a vacuum tube.

These and other objects of the present invention will become apparent to those familiar with animal grooming tools and vacuum tube attachments when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate preferred embodiments in the present invention according to the best modes presently devised for the practical application of the subject vacuum housing attachment, and in which:

FIG. 3 is a side view of the vacuum housing attachment illustrating the flow of fur or hair received when grooming an animal.

FIG. 4 is a perspective view of the vacuum housing attachment is operation, when grooming the animal.

DETAILED DESCRIPTION OF THE PREFERRED EMBODIMENTS

Figure 1:
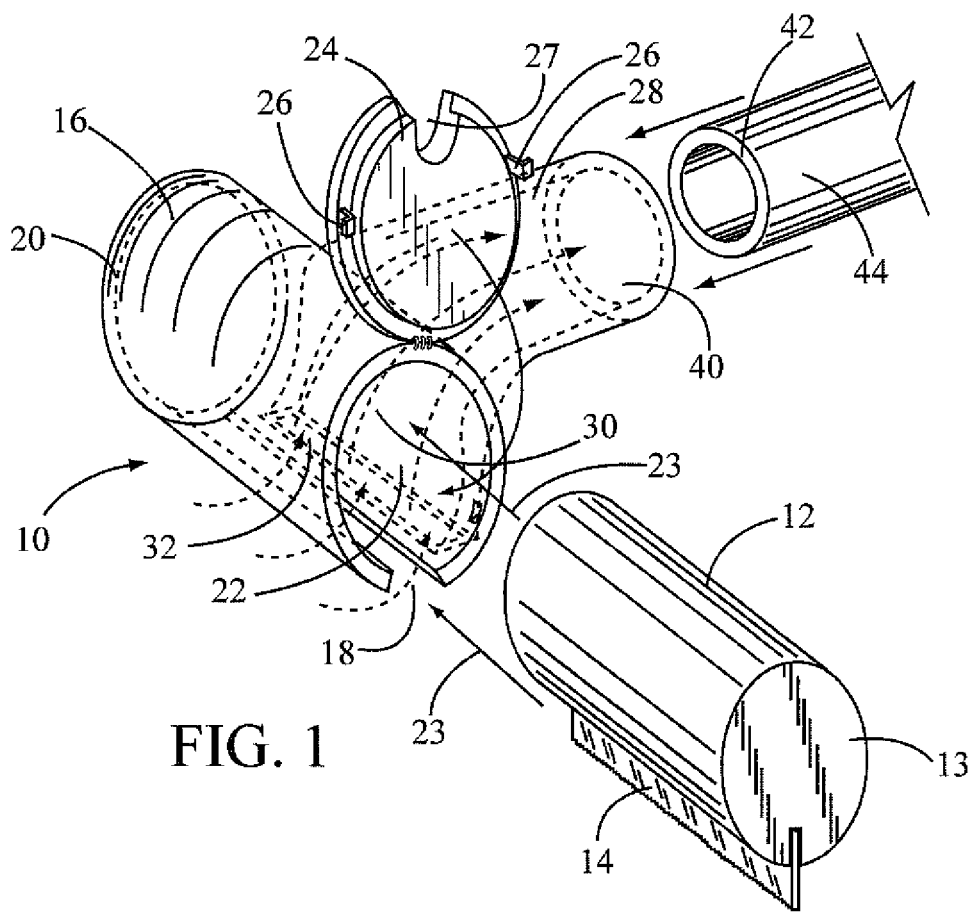
FIG. 1 is a perspective view of the subject animal grooming tool vacuum housing attachment shown with an animal grooming tool positioned to be inserted into the housing attachment.

In FIG. 1, a perspective view of the subject animal groom tool vacuum housing attachment shown having general reference numeral 10. The vacuum housing attachment 10 is adapted for receiving an animal grooming tool 12. The grooming tool 12 includes a grooming tool handle 13 with an outwardly extending grooming tool blade 14.

The subject vacuum housing attachment 10 includes an inverted "U" shaped tool housing 16 with an open bottom portion 18, a closed first end portion 20 and an open second end portion 22. As mentioned above, the open second end portion 22 is adapted for receiving the grooming tool 12 therethrough, as indicated by arrows 23. The tool housing 16 is adapted for holding the grooming tool 12 in a snug fit. Mounted on top of the tool housing 16 and next to the open second end portion 22 is a hinged lid 24. The hinged lid 24, with clips 26, is held in a closed position, when the grooming tool 12 is inserted inside the housing 16. The lid 24, includes a "U" shaped notch 27. When the lid 24 is in a closed position, the notch 27 allows a vacuum to be drawn from the side of the grooming blade 14 as the fur or hair is removed from the animal.

Attached to a rear portion of the tool housing 16 is a hollow handle 28. One end 30 of the hollow handle 28 includes a vacuum intake port 32 adapted for receiving fur or hair, shown as arrows 34, from an animal 36, as the animal is being groomed. This feature is shown in FIGS. 3 and 4. An opposite end 38 of the hollow handle 28 includes a vacuum exit port 40 adapted for attachment to one end 42 of a vacuum tube 44.

Figure 2:
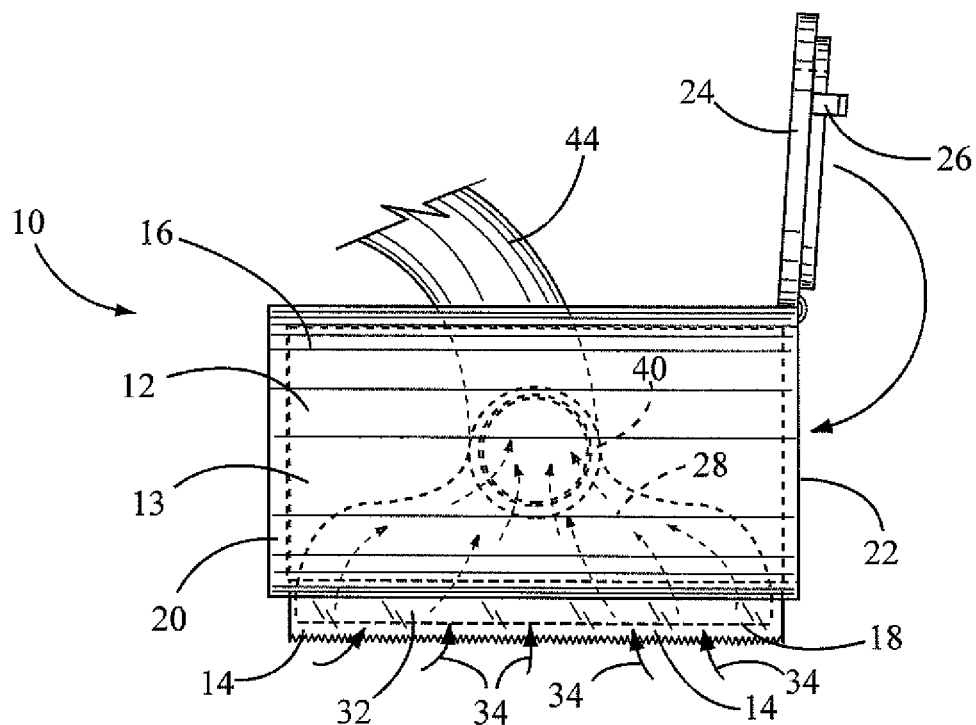
FIG. 2 is a front view of the vacuum housing attachment with a hinged lid held in an open position.

In FIG. 2, a front view of the vacuum housing attachment 10 is shown with the hinged lid 24 held in an open position. In this drawing, the animal grooming tool 12 has been inserted inside the inverted "U" shaped tool housing 16, with the grooming tool blade 14 extending downwardly below the housing for engaging the fur or hair 34 of the animal 36.

In FIG. 3, a side view of the vacuum housing attachment 10 is illustration, with the flow of fur or hair 34, received from grooming the animal 36 being sucked up through the intake port 32, through the hollow handle 28, out the exit port 40, and then into the vacuum tube 44. It should be noted, the intake port 32 of the hollow handle 28 is disposed above a bottom of the grooming tool blade 14. In this manner, the intake port 32 does not interfere with the grooming of the animal as the grooming tool blade 14 glides through the fur and hair of the animal.

In FIG. 4, a perspective view of the vacuum housing attachment 10 is shown in operation, when grooming the animal 36. In this drawing, the operator of the attachment 10, with the animal grooming tool 12 inserted therein, grips the handle 28 and moves the grooming tool blade 14 from the front of the animals to the rear of the animal's back as the loose fur and hair 35 is vacuumed into the hollow handle 28 and then into the vacuum tube 44.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A vacuum housing attachment used with an animal grooming tool, the grooming tool including a tool handle and a grooming tool blade, the housing attachment used for vacuuming loose fur and hair as an animal is groomed, the vacuum housing attachment comprising:

an inverted "U" shaped tool housing, the tool housing includes an open bottom portion, a closed first end portion and an open second end portion, the open second end portion is adapted for receiving the grooming tool therethrough, the tool housing adapted for holding the grooming tool in a snug fit; and a hollow handle attached to portion of the "U" shaped tool housing, one end of the hollow handle including a vacuum intake port adapted for receiving the fur or hair from the animal as the animal is being groomed, an opposite end of the hollow handle including a vacuum exit port adapted for attachment to a vacuum tube.

2. The vacuum housing attachment as described in claim 1 wherein the grooming tool blade extends downwardly through the open bottom portion of the inverted "U" shaped tool housing.

3. The vacuum housing attachment as described in claim 2 wherein the vacuum intake port is disposed next to and above the grooming tool blade extending downwardly through the open bottom portion of the inverted "U" shaped tool housing.

4. The vacuum housing attachment as described in claim 1 further including a hinged lid mounted on the tool housing and disposed next to the second end portion.

5. The vacuum housing attachment as described in claim 4 wherein the hinged lid includes clips for holding the hinged lid in a closed position when the grooming tool is inserted inside the tool housing.

6. The vacuum housing attachment as described in claim 4 wherein the hinged lid includes a "U" shaped notch when the lid is in a closed position, the notch allows a vacuum to be drawn from a side the grooming tool as the fur or hair is removed from the animal.

7. A vacuum housing attachment used with an animal grooming tool, the grooming tool including a tool handle and a grooming tool blade, the housing attachment used for vacuuming loose fur and hair as an animal is groomed, the vacuum housing attachment comprising:

an inverted "U" shaped tool housing, the tool housing includes an open bottom portion, a closed first end portion and an open second end portion, the open second end portion is adapted for receiving the grooming tool therethrough, the tool housing adapted for holding the grooming tool in a snug fit, the grooming tool blade extending downwardly through the open bottom portion of the tool housing; and a hollow handle attached to portion of the "U" shaped tool housing, one end of the hollow handle including a vacuum intake port adapted for receiving the fur or hair from the animal, as the animal is being groomed, an opposite end of the hollow handle including a vacuum exit port adapted for attachment to a vacuum tube.

8. The vacuum housing attachment as described in claim 7 wherein the vacuum intake port is disposed next to and above the grooming tool blade extending downwardly through the open bottom portion of the inverted "U" shaped tool housing.

9. The vacuum housing attachment as described in claim 7 further including a hinged lid mounted on the tool housing and disposed next to the second end portion.

10. The vacuum housing attachment as described in claim 9 wherein the hinged lid includes clips for holding the hinged lid in a closed position when the grooming tool is inserted inside the tool housing.

11. The vacuum housing attachment as described in claim 7 wherein the hinged lid includes a "U" shaped notch when the lid is in a closed position, the notch allows a vacuum to be drawn from a side the grooming tool as the fur or hair is removed from the animal.

* * * * *